No. 855,677. PATENTED JUNE 4, 1907.
A. THOMPSON.
PICK HAVING DETACHABLE POINTS.
APPLICATION FILED APR. 24, 1906.

Inventor
Albert Thompson
By
his Attorney

UNITED STATES PATENT OFFICE.

ALBERT THOMPSON, OF NEWBURGH, NEW YORK.

PICK HAVING DETACHABLE POINTS.

No. 855,677.  Specification of Letters Patent.  Patented June 4, 1907.

Application filed April 24, 1906. Serial No. 313,456.

*To all whom it may concern:*

Be it known that I, ALBERT THOMPSON, a citizen of the United States, residing at Newburgh, county of Orange, and State of New York, have invented certain new and useful Improvements in Picks Having Detachable Points, of which the following is a specification.

This invention relates to picks having detachable points.

The object of my invention is the provision of a pick having points provided with novel shanks or tenons, together with a pick head or holder having novel sockets to receive said shanks or tenons, and set screws on the head or holder for clamping the tenons or shanks in the sockets in an improved fashion.

Among the advantages gained in the use of my pick are the following: strength, lightness, durability, few and simple parts, interchangeability of pick points so that various kinds of points may be used at will, cheapness of manufacture on account of the elimination of much machining of the parts, adaptability of the holder or head for straight boring or drilling of the sockets to receive the shanks or tenons, facility in turning the shanks or tenons of the points, and adaptability for rigid clamping of the points and prevention of accidental detachment thereof.

Other objects of the invention will appear hereinafter.

The invention is set forth fully hereinafter and the novel features are recited in the appended claims.

Figure 1:
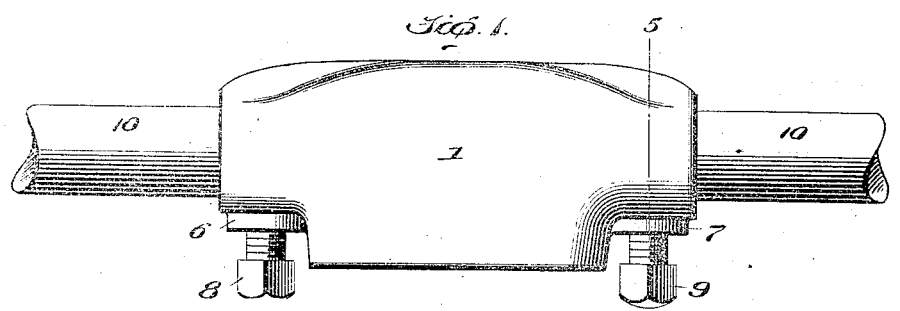
Figure 2:
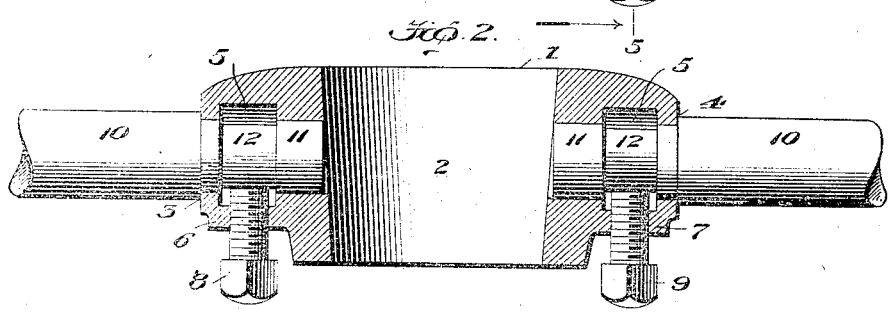
Figure 3:
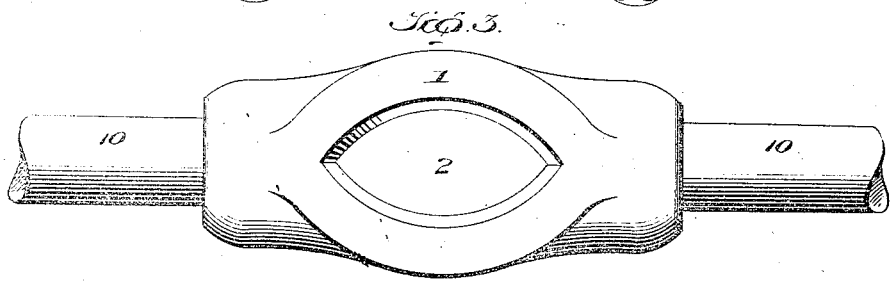
Figure 4:
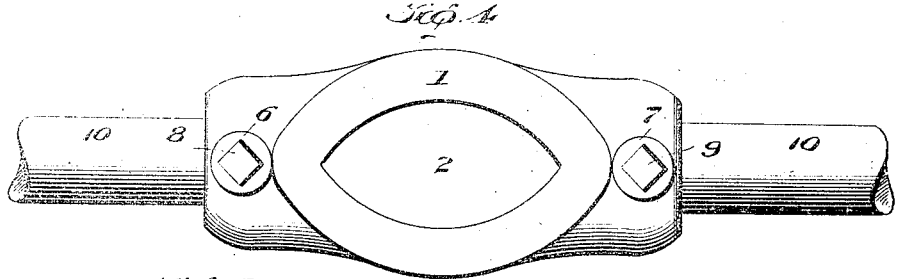
Figure 5:
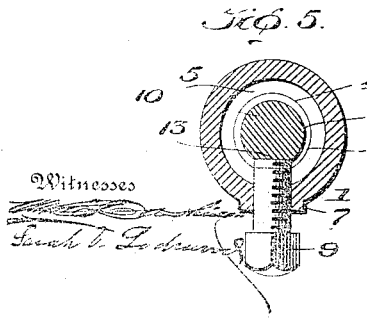
Figure 6:
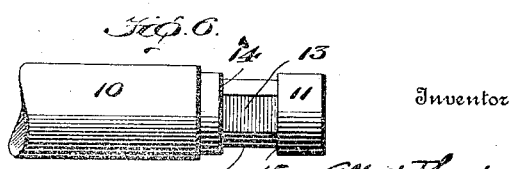

In the accompanying drawings: Figure 1 is a side view of the pick; Fig. 2, a longitudinal section; Fig. 3, a top view; Fig. 4, a bottom view; Fig. 5, a section on line 5—5 of Fig. 1; and Fig. 6, a bottom plan of the shank of one of the points.

The pick head or holder 1 may be of cast metal fashioned with an eye 2 for the handle or helve.

The sockets 3 and 4 are cast with an annular enlarged recess 5 and they are in line with each other so that they may be finished by straight boring or drilling in one operation from end to end of the pick head or holder 1, said sockets intersecting the eye 2. This manner of positioning the sockets in line with each other and of boring or drilling them greatly cheapens the cost of production of the tool over picks having detachable points as heretofore known to the art as expensive machining is rendered unnecessary. The deep recesses 5 which are located intermediate the ends of the sockets do away with considerable machine work which would otherwise be necessary.

On its under side the holder is provided with bosses 6 and 7, through which are threaded set screws 8 and 9 whose tips enter the sockets through the recesses or chambers 5.

The pick points 10 may be of any desired form and they are provided with the cylindrical shanks or tenons 11 which are of a size and length to fit in the respective sockets 3 and 4, said cylindrical parts being provided with the smaller centrally located annular depressions or grooves 12, which lie opposite the chambers or recesses 5. The shanks or tenons are provided with flats 13, thereby providing shoulders 14 and 15. The tips of the set screws 8 and 9 are adapted to bear upon these flats intermediate the shoulders 14 and 15. By having the flats somewhat longer than the diameters of the set screws, any slight inaccuracies in positioning the set screws in any given pick holder or head will not affect the use of any interchangeable pick point in that head or holder. The flats serve, also, to properly locate the shank or tenon when inserting it in its socket so that this operation is quickly accomplished.

Having thus described my invention, what I claim as new and desire to secure by Letters Patent, is:—

1. In a pick, the combination with a holder or head having an eye for the handle or helve and cylindrical sockets located in alinement with each other and opening into the eye aforesaid, of pick points having cylindrical shanks received in said sockets, and means for holding the pick points.

2. In a pick, the combination with a pick point holder or head having a cylindrical socket, of a set screw threaded through the holder or head, and a pick point having a cylindrical unthreaded shank received in the socket and provided with an annular groove having a "flat" adapted for engagement by the tip of the screw, said groove being considerably wider than the diameter of the tip of the screw.

In testimony whereof, I hereunto affix my signature in presence of two witnesses.

ALBERT THOMPSON.

Witnesses:
CHAS. THOERNER,
JAMES CULLEN.